United States Patent
Lin et al.

(10) Patent No.: US 8,502,110 B2
(45) Date of Patent: Aug. 6, 2013

(54) MULTIBEAM LASER DEVICE FOR FABRICATING A MICRORETARDER BY HEATING PROCESS

(75) Inventors: Lang Chin Lin, Hsinchu (TW); Kuen Lee, Hsinchu (TW); Chao Hsu Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1215 days.

(21) Appl. No.: 12/188,605

(22) Filed: Aug. 8, 2008

(65) Prior Publication Data

US 2009/0159578 A1 Jun. 25, 2009

(30) Foreign Application Priority Data

Dec. 21, 2007 (TW) ................ 96149150 A

(51) Int. Cl.
- *B23K 26/067* (2006.01)
- *B23K 26/38* (2006.01)
- *H01S 3/23* (2006.01)

(52) U.S. Cl.
USPC .............. 219/121.62; 219/121.7; 219/121.77; 372/29.011; 372/29.021

(58) Field of Classification Search
USPC 219/121.65, 121.77, 121.82, 121.61–121.72, 219/121.83; 372/9, 29.011, 29.021, 38.01; 385/14

See application file for complete search history.

(56) References Cited

U.S. PATENT DOCUMENTS

| | | | | |
|---|---|---|---|---|
| 3,702,914 A | * | 11/1972 | Noura | 219/73 |
| 4,535,218 A | * | 8/1985 | Krause et al. | 219/121.68 |
| 4,945,489 A | * | 7/1990 | Vahab | 219/121.78 |
| 5,327,285 A | | 7/1994 | Faris | |
| 5,844,717 A | | 12/1998 | Faris | |
| 6,498,679 B2 | * | 12/2002 | Lee et al. | 359/489.11 |
| 7,767,930 B2 | * | 8/2010 | Wilbanks et al. | 219/121.71 |
| 2007/0075063 A1 | | 4/2007 | Wilbanks et al. | |

FOREIGN PATENT DOCUMENTS

| | | |
|---|---|---|
| JP | 2005109324 A * | 4/2005 |
| TW | 473654 | 1/2002 |
| TW | 574632 | 2/2004 |

OTHER PUBLICATIONS

Office Action issued Apr. 11, 2012 for TW Counterpart Application No. 096149150.

* cited by examiner

*Primary Examiner* — Samuel M Heinrich
(74) *Attorney, Agent, or Firm* — WPAT, P.C.; Anthony King

(57) ABSTRACT

A multi-beam laser device is used to make a microretarder plate, which comprises a plurality of first retardation state areas and second retardation state areas alternating with each other. The device comprises an infrared laser, a beam splitter, and a driving means. The beam splitter is used to split the laser beam into a plurality of equal intensity parallel beams and bring the parallel beams into focus. The driving mechanism is used to drive the beam splitter in one direction, and the beam splitter will scan a plurality of parallel scan lines by the direction on a surface.

18 Claims, 5 Drawing Sheets

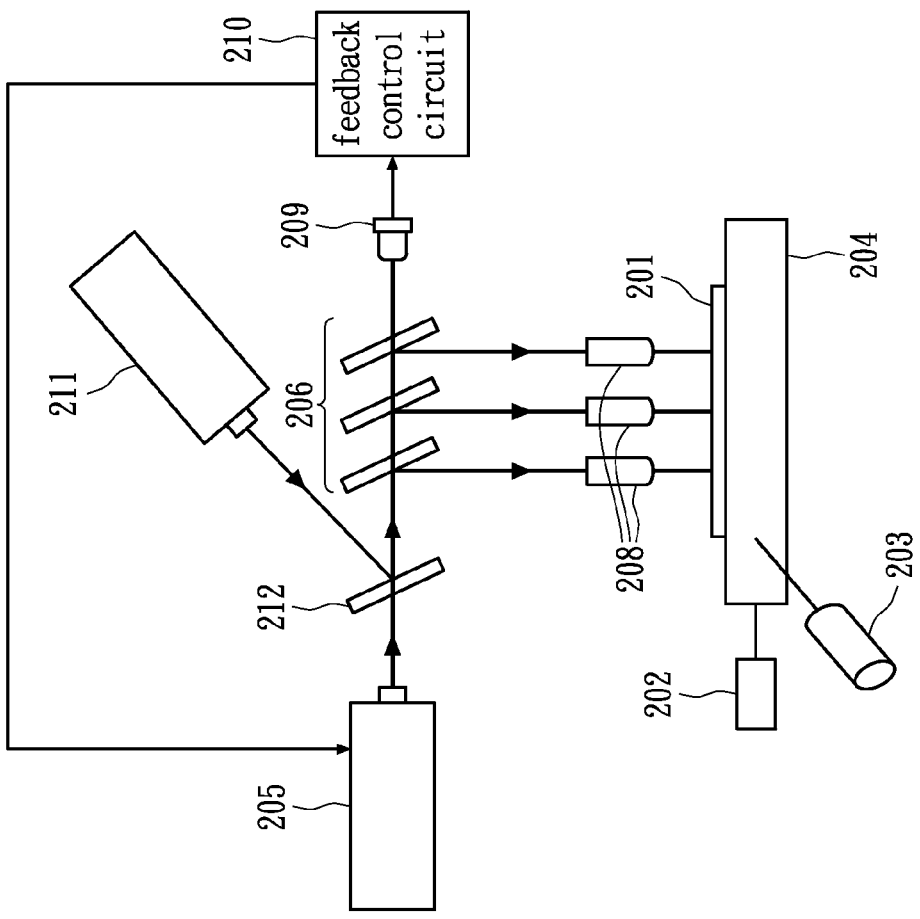
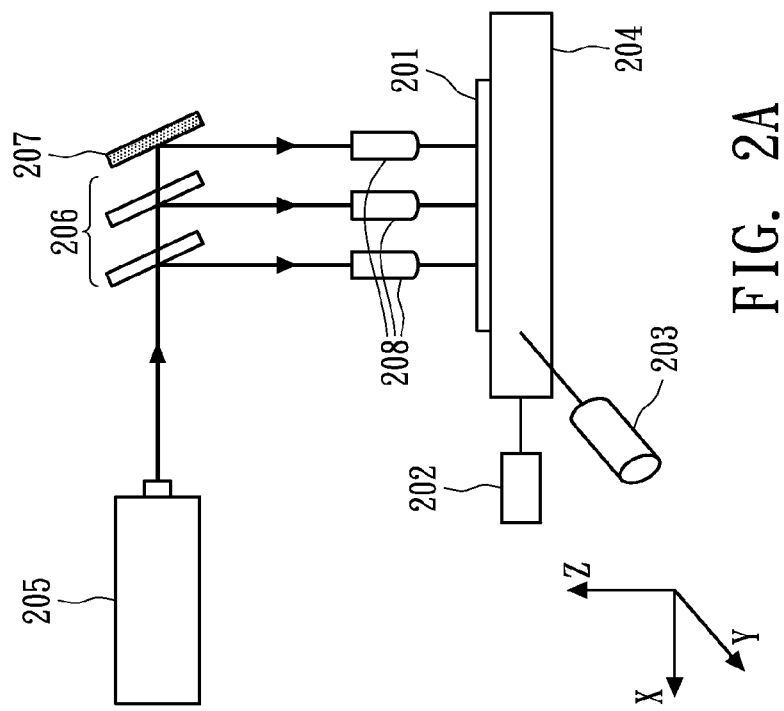
FIG. 2B
FIG. 2A

MULTIBEAM LASER DEVICE FOR FABRICATING A MICRORETARDER BY HEATING PROCESS

BACKGROUND OF THE INVENTION

1. Field of the Invention

The present invention relates to a heating process, and more particularly to a non-contact optical heating process.

2. Description of the Related Art

3-D display monitors have become a clear roadmap of the next generation, and display companies invest a lot of resources to research and develop more attractive products to satisfy the demand of the market. However, many key components such as 3D display devices are still waiting for a breakthrough.

U.S. Pat. No. 5,327,285 and its continuation U.S. Pat. No. 5,844,717 disclose a method to fabricate a micropolarizer, which is made by lithography and etching.

U.S. Pat. No. 6,498,679 discloses a structure of a microretarder, which uses a laser heating device to illuminate a transparent retarder in a heating process such that an intercrossing microretarder plate is formed on that material, as shown in FIG. 1. Although the reference art describes a general idea to manufacture the microretarder in a laser or circuit board heating process, no detailed manufacturing apparatus or method is disclosed Generally, use of lithography and etching processes can amount to procural of a precise micropolarizer, but the cost is high. To date, the industry has not seen the use of optical heating process to mass-produce a microretarder, and thus it is urgently needed to develop a low cost and high-speed manufacture solution.

SUMMARY OF THE INVENTION

The present invention proposes a multibeam laser device for fabricating a microretarder by a heating process. The multibeam laser device comprises an infrared laser source, a multi-beam module and a first driving device. The multi-beam module is configured to split an output beam of the infrared laser source into a plurality of parallel beams with substantially equal intensity. The first driving device is configured to provide the multi-beam module with a scanning direction. The multi-beam module forms a plurality of parallel scanning lines on a surface of a retarder in accordance with the scanning direction.

The present invention proposes a multibeam laser device for fabricating a microretarder by a heating process. The multibeam laser device comprises an infrared laser source, a multi-beam module and a stage. The multi-beam module is configured to split an output beam of the infrared laser source into a plurality of parallel beams with substantially equal intensity. The stage is configured to provide the multi-beam module with a scanning direction. The multi-beam module forms a plurality of parallel scanning lines on a surface of a retarder in accordance with the scanning direction.

The present invention proposes a multibeam laser device for fabricating a microretarder by a heating process. The multibeam laser device comprises an infrared laser source, a splitter module, a focus module and a first driving device. The splitter module is configured to split an output beam of the infrared laser source into a plurality of parallel beams with substantially equal intensity. The focus module is configured to focus the parallel beams on one surface of a retarder. The first driving device is configured to provide the multi-beam module with a scanning direction. The multi-beam module forms a plurality of parallel scanning lines on a surface of the retarder in accordance with the scanning direction.

BRIEF DESCRIPTION OF THE DRAWINGS

The invention will be described according to the appended drawings in which:

FIGS. 2A and 2B show a multibeam laser device for fabricating a microretarder by a heating process according to one embodiment of the present invention.

PREFERRED EMBODIMENT OF THE PRESENT INVENTION

Figure 1:
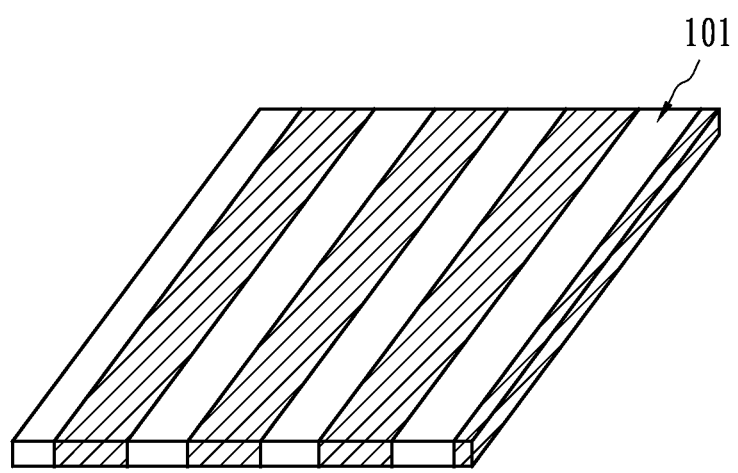
FIG. 1 shows a prior microretarder structure.

FIG. 2 shows a multibeam laser device for fabricating a microretarder by a heating process according to one embodiment of the present invention. One of the best ways to fabricate the pattern of the retarder 101 as shown in FIG. 1 by a heating process is to use several parallel lights scanning the surface of the microretarder. Even for a large-scale microretarder, only a couple of iterations are required. Based on a similar concept, the present invention proposes a heating technique having multiple beams perform on the retarder 101. In the embodiment shown in FIG. 2A, a retarder 201 is disposed on a stage 204 driven by an X-axis motor 202 and a Y-axis motor 203. The Y-axis motor 203 drives the stage 204 such that a plurality of scanning lines are formed when the laser passes through the retarder 201. The X-axis motor 202 drives a Y-direction scan based on different X-direction positions. Under the driving of the X-axis motor 202 and Y-axis motor 203, the stage 204 is capable of fabricating patterns that cross over the X and Y planes as shown in FIG. 1. The X-axis motor 202 and Y-axis motor 203 used by the driving stage 204 are either servo motors or step motors. The parallel multibeams with similar strength and space are obtained by forcing an output beam of an infrared laser 205 to pass through a series of splitters 206 and incorporating the light generated by the mirror 207. Finally, the multibeams focus on the retarder 201 through the focus lens 208. The infrared laser 205 can be a gas laser or a solid laser. The design in FIG. 2B considers both the stability while the laser is processing and the adjustment demand of optical devices. Therefore, a laser power meter 209 and its feedback control circuit 210 are installed behind the splitter 206. The laser power meter 209 generates a signal after the laser is received, and the signal is used to adjust the output of the laser through a comparison performed by the feedback control circuit 210. Under such a control method, the laser light can be stably outputted and remains stable. In addition, because the light source is an infrared laser 205, the light path of which is not easy to adjust, a splitter 212 on the light path of the infrared laser 205 is used to introduce a beam of a visible laser 211. Because of the visible light, the space between the laser beams or diameter of the laser beams are more easily adjusted.

Figure 3A:
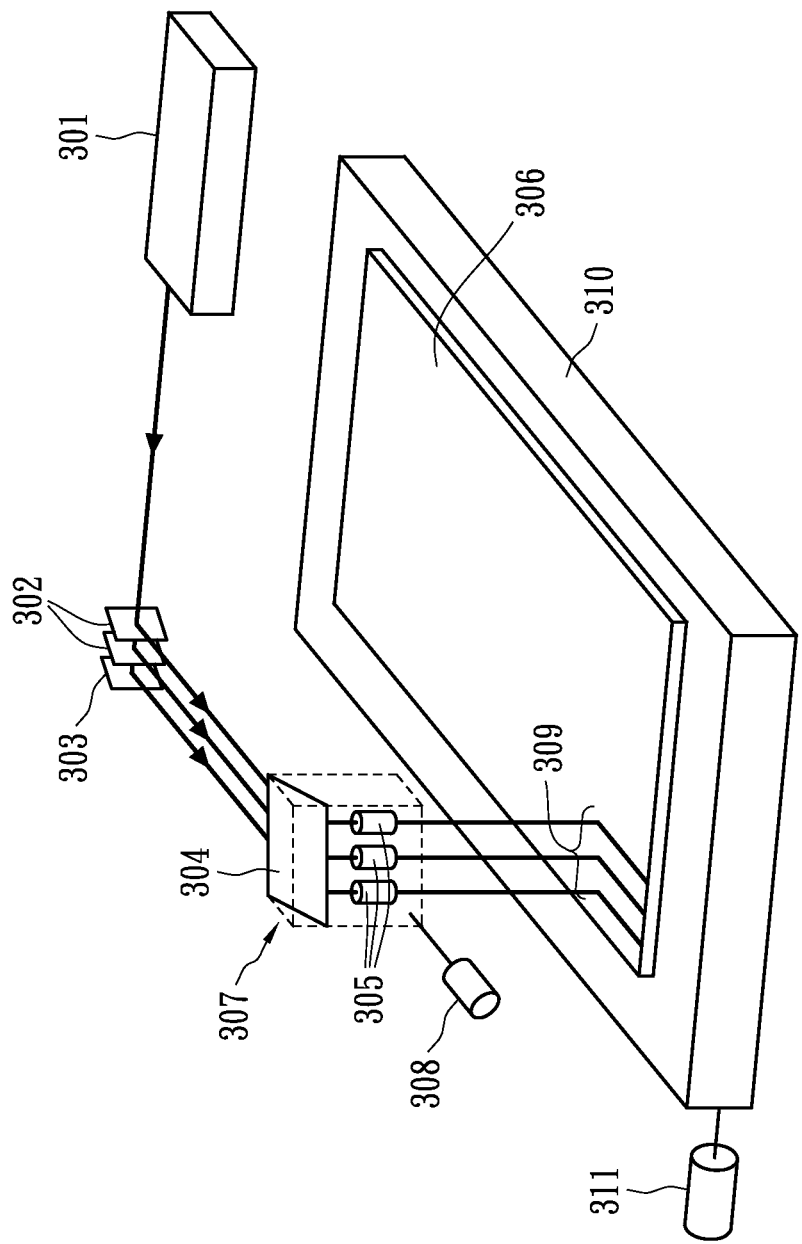
FIGS. 3A and 3B show a multibeam laser device for fabricating a microretarder by a heating process according to another embodiment of the present invention.
Figure 3B:
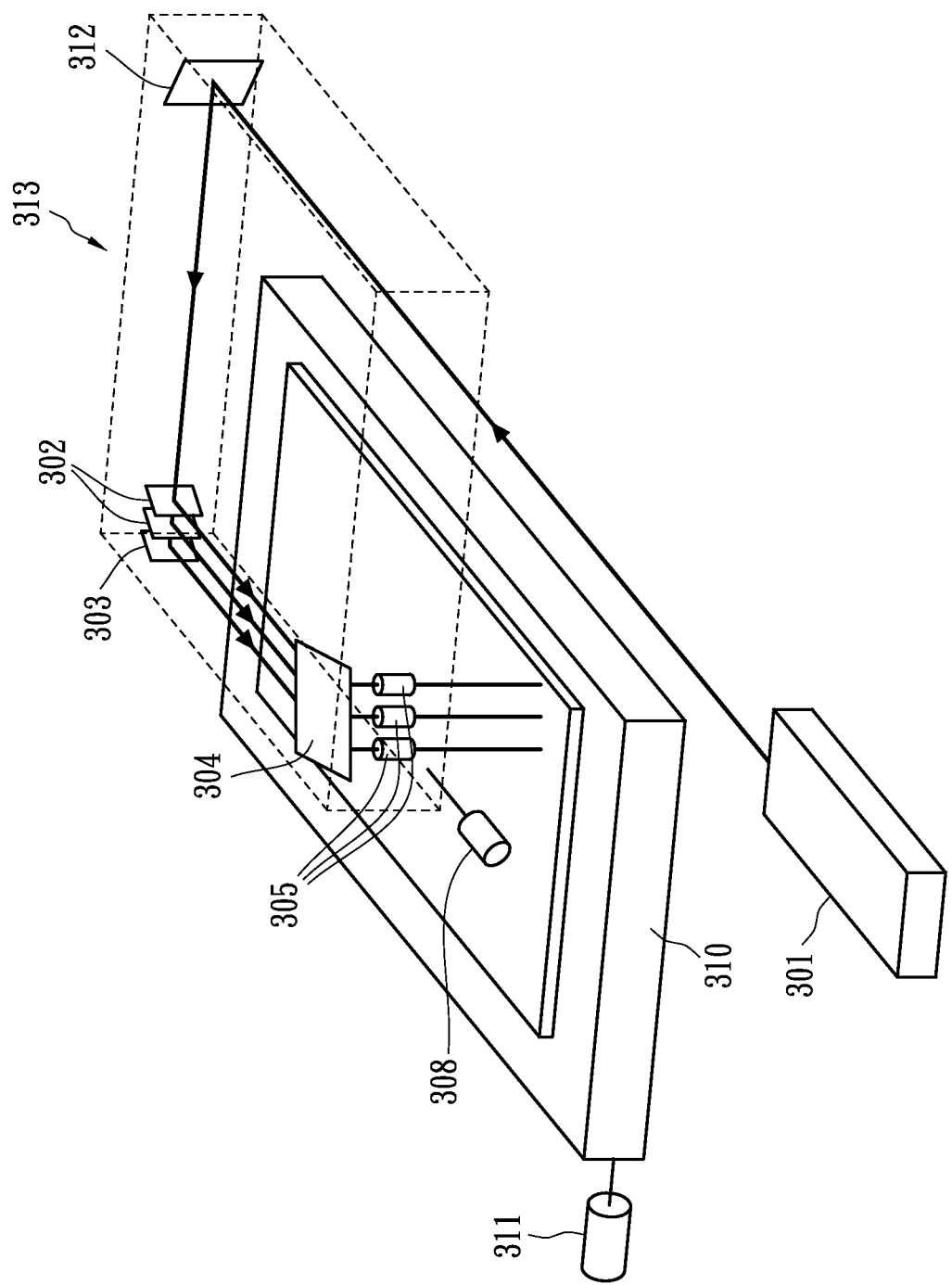

FIG. 3 shows a multibeam laser device for fabricating a microretarder by a heating process according to another embodiment of the present invention. The beams of the infrared laser 301 in FIG. 3A form a plurality of beams through a series of splitters 302 and mirrors 303. The plurality of beams focus on a retarder 306 through a mirror 304 and focus lenses 305. The mirror 304 and focus lenses 305 can be organized as a scanning module 307 and driven by a Y-axis motor 308 such that the laser beams can form the plurality of scanning lines 309 in Y-axis. The stage 310 is movable in the X-direction by the driving of the X-axis motor 311 such that the scanning actions along Y-axis can be repeatedly performed at different positions along the X-axis until a scanning bar diagram at a fixed cycle on the retarder 306 is formed. The structure in FIG. 3B additionally adds a mirror 312 such that the beam of the infrared laser 301 is made parallel to the Y-axis. Under such a design methodology, the splitter 302 and mirror 303 move together with the scanning module 307 in FIG. 3A such that the whole optical devices are integrated into a single scanning module 313 for easier manufacturing and adjustment. Also, based on the demand of a precise process, the whole optical device including lasers can be integrated into a single scanning module.

Figure 4:
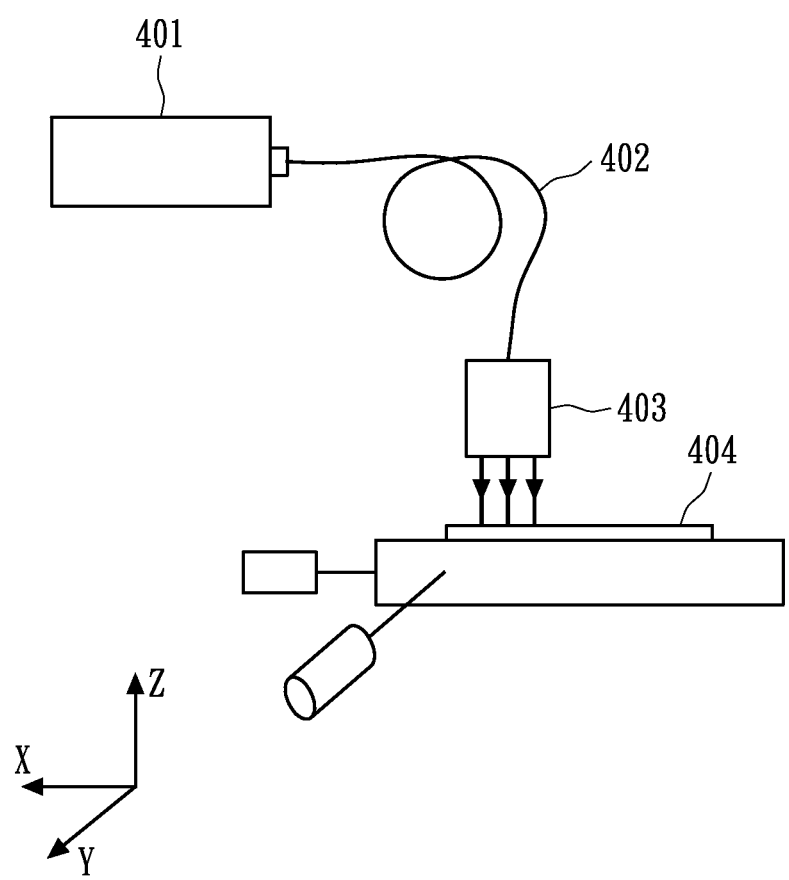
FIG. 4 shows a multibeam laser device for fabricating a microretarder by a heating process according to another embodiment of the present invention.

FIG. 4 shows a multibeam laser device for fabricating a microretarder by a heating process according to another embodiment of the present invention. In addition to a splitter, other devices such as a beam-splitting module, an optical fiber coupling splitter, a planar lightwave splitting module, a granting module or a microsplitter by MEMS can be used to split a single line into several beams. An infrared laser 401 introduces a laser beam into a splitting element 403 through an optical fiber 402. The splitting element 403 splits the laser beam into a plurality of laser beams, casting on a retarder 404 after focusing so as to conduct a heating process.

The above-described embodiments of the present invention are intended to be illustrative only. Numerous alternative embodiments may be devised by persons skilled in the art without departing from the scope of the following claims.

What is claimed is:

1. A multibeam laser device for fabricating a microretarder by a heating process, comprising:
    an infrared laser source;
    a multi-beam module configured to split an output beam of the infrared laser source into a plurality of parallel beams with substantially equal intensity, wherein the multi-beam module comprises a plurality of optical elements arranged in predetermined positions such that the output beam of the infrared laser source is split into the plurality of parallel beams corresponding to the predetermined positions;
    a first driving device configured to provide the multi-beam module with a scanning direction, wherein the multi-beam module forms a plurality of parallel scanning lines on a surface of a retarder in accordance with the scanning direction;
    a laser power meter configured to receive the output beam passing through the multi-beam module and generate a signal; and
    a feedback control circuit configured to use the signal to adjust the output beam of the infrared laser so as to maintain stability of the infrared laser source.

2. The multibeam laser device of claim 1, further comprising:
    a stage; and
    a second driving device configured to drive the stage in a direction perpendicular to the scanning direction.

3. The multibeam laser device of claim 1, wherein the first driving device is a servo motor or a step motor.

4. The multibeam laser device of claim 1, wherein the infrared laser source is a gas laser or a solid laser.

5. The multibeam laser device of claim 1, wherein the multi-beam module is a beam-splitting module, an optical fiber coupling splitter, a planar lightwave splitting module, a granting module or a microsplitter that is formed by a plurality of splitters and mirrors.

6. The multibeam laser device of claim 1, further comprising a visible laser source, wherein output beams of the visible laser source make an adjustment by passing light paths of the infrared laser source.

7. A multibeam laser device for fabricating a microretarder by a heating process, comprising:
    an infrared laser source;
    a multi-beam module configured to split an output beam of the infrared laser source into a plurality of parallel beams with substantially equal intensity, wherein the multi-beam module comprises a plurality of optical elements arranged in predetermined positions such that the output beam of the infrared laser source is split into the plurality of parallel beams corresponding to the predetermined positions;
    a stage configured to provide the multi-beam module with a scanning direction, wherein the multi-beam module forms a plurality of parallel scanning lines on a surface of a retarder in accordance with the scanning direction;
    a laser power meter configured to receive the output beam passing through the multi-beam module and generate a signal; and
    a feedback control circuit configured to use the signal to adjust the output beam of the infrared laser so as to maintain stability of the infrared laser source.

8. The multibeam laser device of claim 7, wherein the stage comprises a driving device configured to drive the stage such that the multi-beam module is capable of forming the plurality of parallel scanning lines on a surface of the retarder.

9. The multibeam laser device of claim 7, wherein the stage is a servo motor or a step motor.

10. The multibeam laser device of claim 7, wherein the infrared laser source is a gas laser or a solid laser.

11. The multibeam laser device of claim 7, wherein the multi-beam module is a beam-splitting module, an optical fiber coupling splitter, a planar lightwave splitting module, a granting module or a microsplitter that is formed by a plurality of splitters and minors.

12. The multibeam laser device of claim 7, further comprising a visible laser source, wherein output beams of the visible laser source make an adjustment by passing light paths of the infrared laser source.

13. A multibeam laser device for fabricating a microretarder by a heating process, comprising:
    an infrared laser source;
    a splitter module configured to split an output beam of the infrared laser source into a plurality of parallel beams with substantially equal intensity, wherein the splitter module comprises a plurality of optical elements arranged in predetermined positions such that the output beam of the infrared laser source is split into the plurality of parallel beams corresponding to the predetermined positions;
    a focus module configured to focus the parallel beams on one surface of a retarder;
    a first driving device configured to provide the focus module with a scanning direction, wherein the focus module forms a plurality of parallel scanning lines on a surface of the retarder in accordance with the scanning direction;
    a laser power meter configured to receive the output beam passing through the splitter module and generate a signal; and a feedback control circuit configured to use the signal to adjust the output beam of the infrared laser, wherein the laser power meter is installed behind the splitter module so as to maintain stability of the infrared laser source.

14. The multibeam laser device of claim 13, further comprising:
a stage; and
a second driving device configured to drive the stage in a direction perpendicular to the scanning direction.

15. The multibeam laser device of claim 13, wherein the stage is a servo motor or a step motor.

16. The multibeam laser device of claim 13, wherein the infrared laser source is a gas laser or a solid laser.

17. The multibeam laser device of claim 13, wherein the splitter module is a beam-splitting module, an optical fiber coupling splitter, a planar lightwave splitting module, a granting module or a micro splitter that is formed by a plurality of splitters and minors.

18. The multibeam laser device of claim 13, further comprising a visible laser source, wherein output beams of the visible laser source make an adjustment by passing light paths of the infrared laser source.

* * * * *